United States Patent [19]
Dzhragatspanvan et al.

[11] Patent Number: 6,015,502
[45] Date of Patent: Jan. 18, 2000

[54] REVERSING FLOW COALESCING SYSTEM

[75] Inventors: Misak Dzhragatspanvan, Van Nuys; William A. Greene, Long Beach, both of Calif.

[73] Assignee: Spintek Systems, Inc., Huntington Beach, Calif.

[21] Appl. No.: 08/944,602

[22] Filed: Oct. 6, 1997

Related U.S. Application Data

[60] Provisional application No. 60/028,102, Oct. 9, 1996.

[51] Int. Cl.$^7$ .......................... B01D 24/46; B01D 29/62; C02F 1/00; C02F 1/28
[52] U.S. Cl. .......................... 210/793; 210/690; 210/691; 210/694; 210/791; 210/792; 210/DIG. 5
[58] Field of Search .......................... 210/DIG. 5, 690, 210/691, 694, 791, 792, 793, 797, 798

[56] References Cited

U.S. PATENT DOCUMENTS 4,162,973  7/1979  Lynch .
5,273,654  12/1993  Severing .
5,531,890  7/1996  Keenan .
5,681,462  10/1997  Brockhoff et al. .

Primary Examiner—W. L. Walker
Assistant Examiner—Michael Fleming

[57] ABSTRACT

Apparatus is provided for coalescing microscopic droplets of organic (principally hydrocarbons) that are present with particles in an aqueous stream (primarily water), which avoids frequent shutdowns for backwashing. The system includes two anthracite beds (56, 58, FIG. 2) and apparatus for connecting the beds in series. Most of the time, the stream flows down (60) through the first bed and up (64) through the second bed, and to a separator, while particles (74) accumulate at the top of the first bed. When the particles begin to seriously block flow through the first bed, the flow is reversed for a period while the particles are transferred from the top of the first bed to the top of the second bed. After several minutes, the flow is reversed again, causing particles at the top of the second bed to flow to the separator for removal.

4 Claims, 3 Drawing Sheets

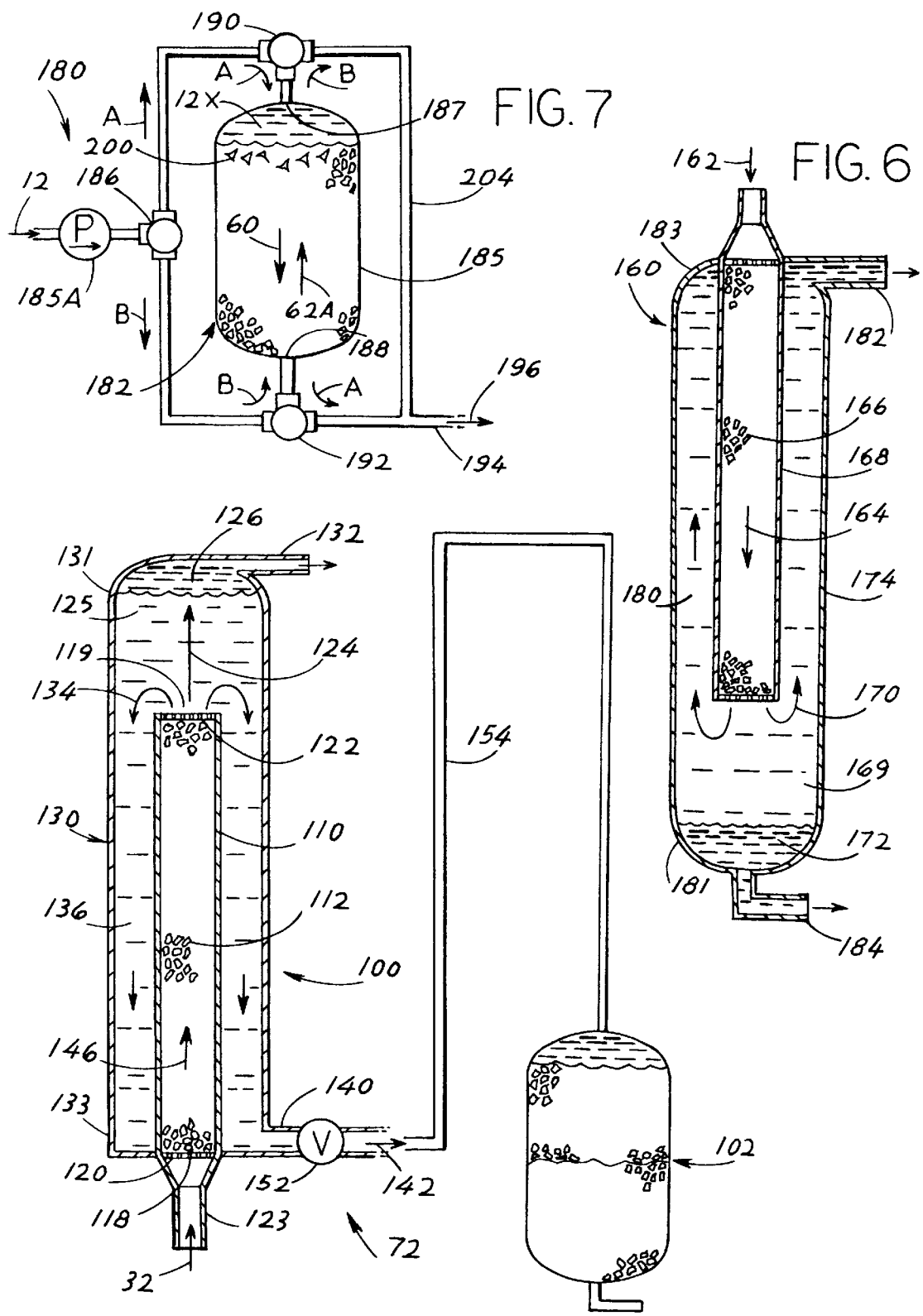

REVERSING FLOW COALESCING SYSTEM

CROSS REFERENCE TO RELATED APPLICATION

This application claims the benefit of U.S. provisional application No. 60/028,102, filed on Oct. 9, 1996.

BACKGROUND OF THE INVENTION

In some industrial processes such as copper mining, large flows of an aqueous stream containing organic, solid particles, and an aqueous solution (water and dissolved acid and minerals), must be treated. The aqueous stream is treated to remove the organic (principally hydrocarbons) and also to separate out particles. The resulting aqueous solution is used in copper mining, as an electrolyte from which copper, in solution, is removed. It is common to remove the organic by first coalescing microscopic droplets of the organic to provide larger drops that can be more easily further coalesced and floated to the top of a tank.

The initial coalescing of the microscopic droplets (e.g. an average of 0.01 mm) of organic is commonly accomplished by passing the stream through a crushed anthracite bed. The anthracite is oleophillic, which allows its surface to be coated with organic. The organic coats the surface of the small crushed anthracite pieces, until the anthracite is saturated with organic and larger drops (e.g. 1 mm) break off to flow downstream. These drops can be more rapidly coalesced to float to the top of a tank from which they can be removed.

When the stream moves through the anthracite bed, the solid particles gradually clog the input end of the bed, so the flow decreases (for a given pressure drop) and the bed is cleaned by backwashing clean water or other cleaning liquid through it. In one process of backwash, the cleaning liquid, particles and untreated organic are passed to a separate processor that processes small quantities of material, so substantially none of the stream is untreated. During such backwash, the operation is stopped, and the stream is not flowed into the anthracite beds and the treated stream is not flowed to the separator. A system that avoided shut downs during backwash, while avoiding the need for a special separator during backwash, would be of value.

SUMMARY OF THE INVENTION

In accordance with one embodiment of the present invention, a coalescing apparatus is provided for coalescing organic that are contained in a fluid stream that also contains an aqueous solution (water and dissolved material) and fine particles. The apparatus includes at least a first container that holds a first bed of coalescing-and-filtering material, usually crushed anthracite. A valve and conduit means is connected so a stream to be treated flows in a first primarily vertically direction through the first bed. When sufficient particles accumulate at an end of the first bed, the flow of the fluid stream (that contains organic) is reversed to flow out the particles to a separator where the organic is removed. In a system with first and second beds connected in series, the fluid stream flows in series through the beds until the first one clogs by solid particles. Then flow is reversed to move the particles to the second bed, and flow is again reversed to pass the particles to the separator. This avoids the passage of any liquid portion of the original stream to the separator without having first passed through an anthracite bed where microscopic droplets are coalesced into drops that can be easily removed from the stream.

The separator can include a media bed formed by packing material lying in a tall vertical tube that, in turn, lies within a tank. The stream that has been treated by the anthracite beds, flows up through the media bed, where the drops are further coalesced, and with the still larger coalesced drops of organic moving up as they exit the top of the tube, and floating from there to the top of the tank where they are removed. The rest of the stream makes a 180° turn, so the upwardly moving stream turns and moves down through a passage formed between the outside of the tube and the inside of the tank. This is highly effective in removing the larger drops from the stream, for a large flow rate stream. Where a fluid stream contains primarily organic and little water, the separator can be constructed to flow the stream down through the media bed.

The novel features of the invention are set forth with particularity in the appended claims. The invention will be best understood from the following description when read in conjunction with the accompanying drawings.

BRIEF DESCRIPTION OF THE DRAWINGS

FIG. 4 is a sectional side view of the media bed of the separating apparatus of FIG. 2.

FIG. 6 is a sectional side view of a media bed of another embodiment of the invention.

FIG. 7 illustrates an anthracite bed coalescing apparatus of another embodiment of the invention.

DESCRIPTION OF THE PREFERRED EMBODIMENTS

Figure 1:
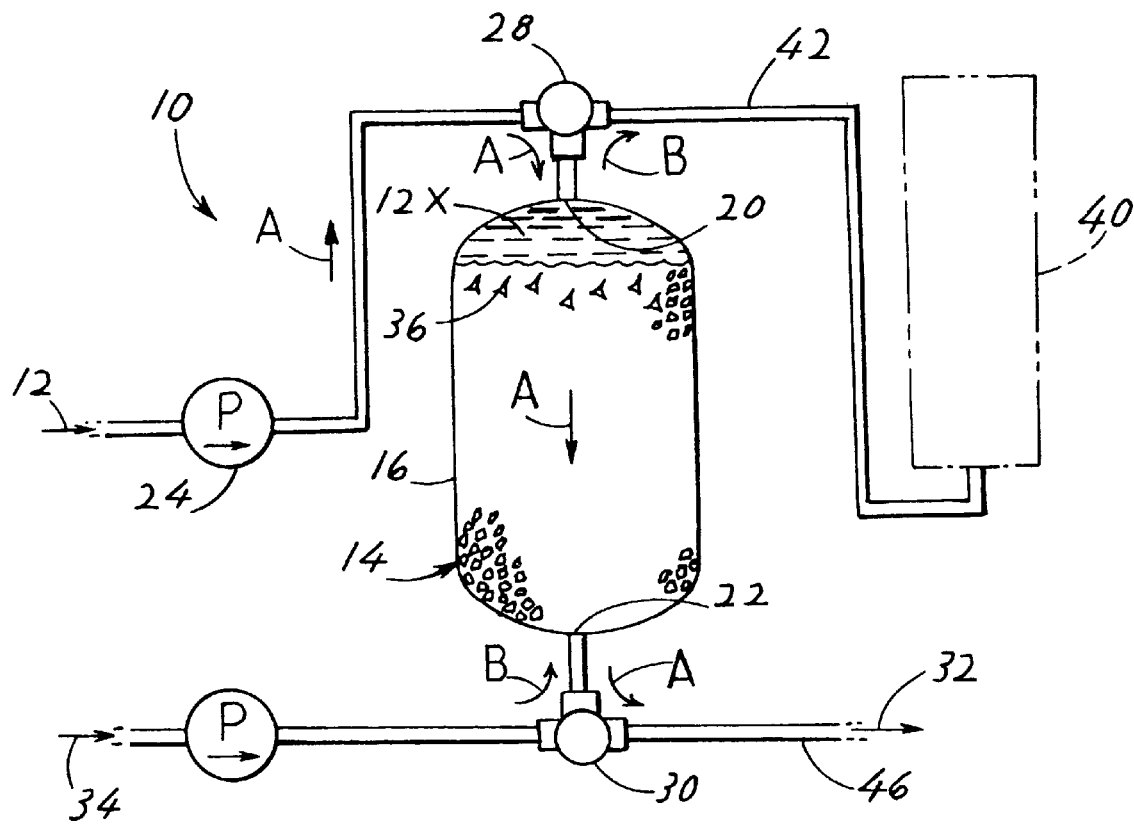
FIG. 1 illustrates an anthracite bed coalescing apparatus of the prior art.

FIG. 1 illustrates a prior art coalescing apparatus 10 which was used to separate components of a fluid stream 12. Usually, the fluid stream is an aqueous stream containing an aqueous solution (water with dissolved material such as acid and a mineral such as copper therein), with fine particles such as clay that have passed through a coarser upstream screen, and organic (principally hydrocarbons) in the form of microscopic droplets. In almost all cases, the particles and organic could be separated in a settling tank, with all but the smallest particles settling to the bottom and with the microscopic droplets of organic floating to the top of the tank (although micron sized droplets often cannot be separated in a settling tank). However, where the stream to be separated flows at a rate such as over 1,000 gallons per minute as is common in copper mining, such settling tanks are not feasible and apparatus of moderate size having large flow capacity are required.

The prior apparatus 10 included a bed 14 of crushed anthracite lying within a container 16 with ports 20, 22 at its top and bottom. Most of the time, a pump 24 pumps the stream through a valve 28 and down through the anthracite bed 14, and through another valve 30, with the emerging stream 32 passed to a polishing or separating apparatus. As the stream passed through the anthracite bed 14, microscopic droplets of organic coated the surfaces of the crushed anthracite pieces (of a size of about one millimeter each)

while much of the particles were trapped at the input end of the bed. As organic continued to flow into the bed, drops of organic separated from the bed and flowed downstream as part of the emerging stream 32. These drops (e.g. 1.0 mm) were many times larger than the microscopic droplets (e.g. average of 0.01 mm) originally entering the anthracite bed, and the larger drops are easier to coalesce and remove from the stream.

As the initial flow along the directions A continued, the upper portion of the bed became clogged with particles that reduce flow, and the particles had to be removed by backwashing. In one backwashing procedure, a separate flushing liquid such as fresh water 34 was directed through a pump along the directions B to flow up through the bed, thereby loosening particles from the top of the bed which flowed along the further path B. The particles 36 at the top of the bed flowed out of the bed, along with a quantity of the untreated stream 12X. In one system, the heel, consisting of the particles and the untreated stream at 12X was directed through a conduit 42 to a settling tank 40 or other device which removed the particles and coalesced the microscopic droplets of organic, the tank 40 having a relatively small flowthrough so equipment of only moderate size could be used. However, during a few minutes of flow to the settling tank or other apparatus, the emerging stream 32 no longer flowed to separating apparatus. Also, the settling tank 40 added to the cost.

Figure 2:
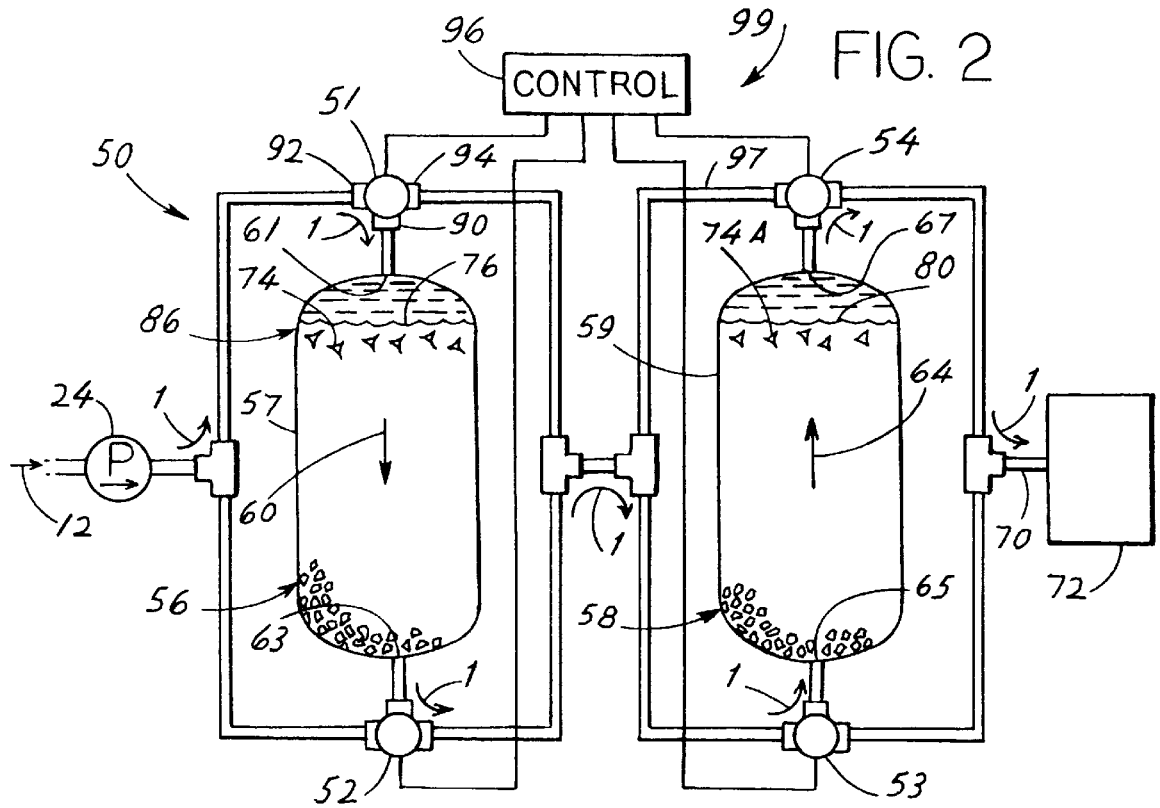
FIG. 2 illustrates an anthracite bed coalescing apparatus of the present invention, during flow in a first direction through the anthracite beds.

FIG. 2 shows a system 50 of the present invention, which includes two beds 56, 58 of crushed anthracite or other similar coalescing-and-filtering material, within containers 57, 59. The apparatus also includes several valves 51–54 and conduits, for directing the flow of the untreated fluid stream 12 in series through the two beds. Most of the time, the stream passes in the direction of arrows "1" to flow along a first path 60 down through the first bed 56 and through ports 61, 63, and along a third path 64 up through the second bed 58 through ports 65, 67, before exiting through a conduit 70 that passes the emerging stream to a polishing, or separation apparatus 72. During a period of operation of perhaps one hour, a quantity 74 of particles is built up at the first or upper end 76 of the first bed, and the flow rate has decreased sufficiently that the particles must be washed out.

Figure 3:
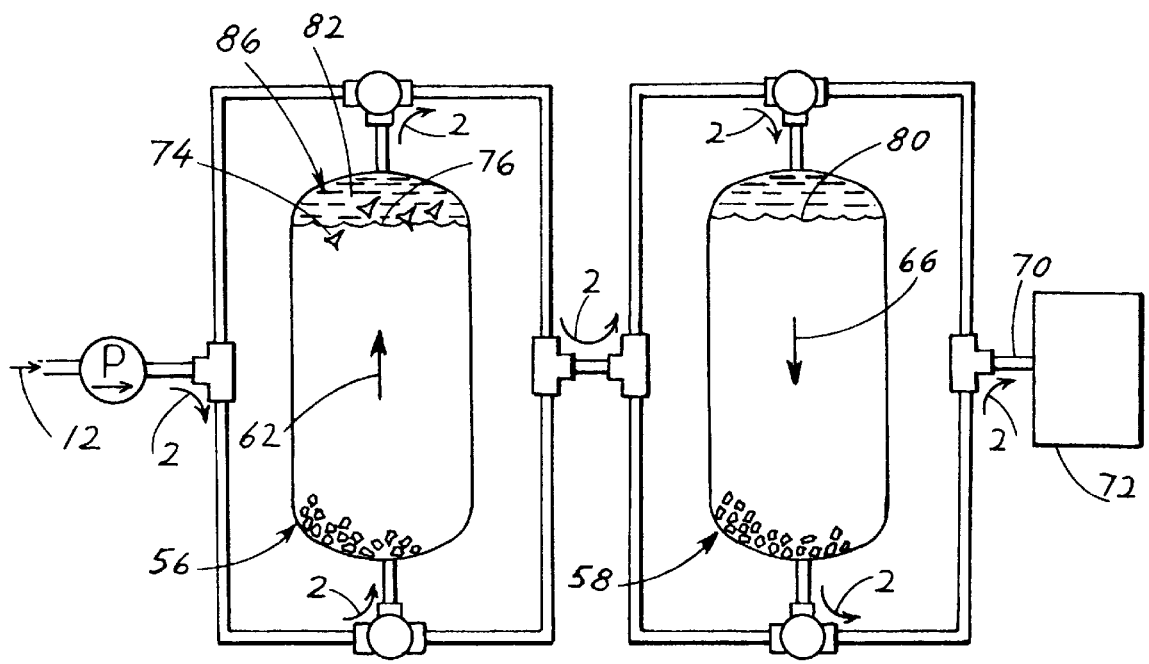
FIG. 3 is a view similar to that of FIG. 2, but shown during reverse flow through the anthracite beds.

FIG. 3 shows the operation of the system 50 during a reversal of flow, when the fluid is directed along the arrows 2. The fluid moves along a second path 62 up through the bed 56, and down along a fourth path 66 through the second bed 58. During such flow, a quantity of particles 74 flows from the upper end 76 of the first bed to the upper end 80 of the second bed. The initial flow contains a quantity 82 of the original fluid stream 12 that has not passed through an anthracite bed, and therefore which still contains microscopic organic droplets. The particles 74 and untreated portion of the fluid stream 82 are collectively referred to as a "heel" 86. This heel passes to the upper end 80 of the second bed 58, with the portion 82 of the fluid stream initially passing to the second bed and with the particles 74 gradually passing to the second bed over a period of several minutes. During the movement of particles 74 from the top of the first bed to the top of the second bed, the fluid stream 12 flows up through the first bed and down through the second bed, and out through the conduit 70. After several minutes (e.g. 10 minutes) almost all of the particles 74 have been transferred to the second bed 58 and clog it. However, the liquid portion 82 of the fluid stream has all passed through the second bed.

After a period of several minutes of the reverse flow in the direction of the arrows 2, the valves are again operated to again reverse the flow so the flow is as originally shown in FIG. 2. During the beginning of the second reversal, fluid passes down through the first bed, and up through the second bed 58 along the third path 64. This flow causes particles 74A which lie at the top of the second bed, to flow out from the top of the second bed into the conduit 70 that leads to the polisher apparatus 72.

It should be emphasized that, although the anthracite beds 56, 58 are effective in trapping solid particles as well as coalescing microscopic droplets of organic, applicant does not wish to use their capacity to trap particles, but only uses the beds to coalesce microscopic droplets to form larger drops that can be readily coalesced and removed from the stream. Thus, the outflow of the particles at 74A from the top 80 of the second bed into the output conduit 70, does not detract from operation. However, the fact that all of the fluid stream that reaches the outlet conduit 70 has passed through at least one anthracite bed, so the microscopic droplets have been coalesced into larger drops, is of great importance. It may be noted that large drops (over about 1 mm) of organic in water cannot readily flow down through a bed so they accumulate at the top of the first bed 56. However, such large drops can flow readily with water up through a bed, so drops of organic readily flow up through the second bed 58.

Each of the valves 51–54 has a main end 90 through which fluid always passes, and two secondary ends 92, 94, with fluid passing through only a selected one of the two secondary ends 92, 94 at any one time. A control 96 that is connected to all four valves, switches them to control the flow to be as shown in FIG. 2 or as shown in FIG. 3. The combination of the valves 51–54, control 96 and conduits 97 may be referred to as a valve and conduit apparatus or means 99. In a system that applicant has designed, the first anthracite bed 56 was sufficiently clogged with particles after about one hour of operation, that flow had to be reversed. The flow was reversed for a period of about ten minutes, while the particles 74 were transferred from the first bed to the second bed. After that, the flow was reversed to the original direction, and continued for another hour.

Figure 5:
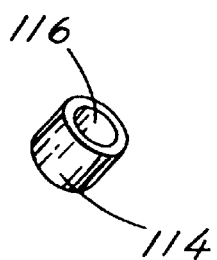
FIG. 5 is an isometric view of an element of the media bed of the apparatus of FIG. 4.

The separator apparatus 72 is shown in FIG. 4 to include a media bed coalescer 100 and an anthracite-garnet bed 102. The coalescer 100 includes a primarily vertical tube 110 of a height of over one meter and a tank 130 surrounding the tube and having upper and lower tank ends 131, 133. A quantity of packing material 112 fills all or most of the tube. The packing material may include numerous elements of the type shown at 114 in FIG. 5. Each element 114 is a short tube of a low cost polymer that is wetted by organic. The through hole 116 is preferably a plurality of millimeters in diameter such as 5 mm, to avoid entrapping particles. In FIG. 4, screen 120, 122 or perforated material lies at inlet and outlet ends (118, 119) of the tube and bed to prevent loss of the packing elements. As the stream 32 passes through a coupling 123 and up through the bed 112, the drops of organic further coalesce, and after leaving the bed these large drops (e.g. 4 mm) continue to move up along the path 124 along an accumulating space 125 whose height is greater than, and preferably at least twice the width of the tube 110, to the top 126 of the tank 130 that surrounds the tube. An organic outlet 132 draws off an organic stream. The portion of the stream that does not continue to rise, passes in a loop 134 of about 180°, to move down along a passage 136 formed between the outside of the tube 110 and the inside of the tank 130, and out through an aqueous outlet 140 that contains the aqueous solution (water with possibly acid and copper dissolved therein) and particles. The stream 142 may be passed through the anthracite-garnet bed 102 where the particles are trapped. In this type of bed 102, the flow is often reversed and the particles are removed by fine screening, all in ways that are known to the prior art.

In the media bed coalescer 100, the upward passage, along path 146 of the stream, enables the large drops of organic to continue moving upwardly along the path 124 before they are removed at the top of the tank. The solid particles are fine particles that tend to move with the surrounding aqueous stream in the loop 134 to the outlet 140. This aids in removing the large drops of organic. The tank 130 must be continually filled with liquid to assure that the organic compound will rise to the top. A valve 152 allows outflow only when the pressure at the bottom of the tank exceeds the pressure at the bottom of a column of water of the height of the tank. A pipe 154 extending above the tank height also can be used to maintain the pressure. Applicant has found that in treating a fluid stream of the type described in U.S. Pat. No. 5,274,653 (water+1% acid+150 ppm RH) that the use of the coalescer 100 alone resulted in recovery of 70 to 75% of the organic. The use of the apparatus 50 of FIGS. 2 and 3 with the coalescer 100 of FIG. 4 resulted in recovery of 85% to 92% of the organic.

In some applications, a stream contains primarily organic plus only a small amount of aqueous solution (usually primarily water). In that case, applicant uses a media bed coalescer of the type shown at 160 in FIG. 6. In this case, the inlet stream 162 passes downwardly, along a path 164 through a media bed 166 lying within a tube 168 constructed in the same manner as the tube and bed of FIG. 4. The organic moves along a 180° loop 170 in an accumulating space 169 and up along a passage 180 to an aqueous outlet 182 at the tank top or second end 183, while the aqueous solution accumulates in a pool 172 at the bottom or first end 181 of the tank 174 and exits through an organic outlet 184 at the tank bottom.

FIG. 7 illustrates another fine coalescer 180 that is somewhat similar to that of FIGS. 2 and 3, except that it uses a single anthracite bed 182. The bed 182 lies in a container 185 with ports 187, 188 at its upper and lower ends. Initially, the fluid stream 12 that includes water, organic, and solid particles (and dissolved material) flows through a pump 185A and a valve 186 along the directions A. The stream is directed by valve 190 to flow along path 60A down through the bed 182 and through a valve 192 to a pipe 194. (It could instead be flowed up through the bed). The pipe 194 carries the effluent 196 to a separator as described above.

When particles 200 build up at the top of the bed 182, the valves 186, 190 and 192 are switched to reverse the flow. The flow is then in the directions B and along path 62A. The particles 200 and a small amount of the original (untreated) stream at 12X pass through pipe 204 to pipe 194, to become part of the effluent 196 that flows to separation apparatus. A small amount of untreated original stream at 12X passes out to the separating apparatus, but this has only a moderate effect on the final separation. When particles build up at the bottom of the bed, the flow is again reversed.

Thus, the invention provides apparatus for coalescing organic that are contained as microscopic droplets in a fluid stream that also contains water and fine particles (usually solid). The apparatus includes at least one container that holds a bed of coalescing-and-filtering material, preferably crushed anthracite. Valve and conduit means are connected to ports at the top and bottom of the bed. First, the fluid stream is passed in a first direction through the bed, such as down through the bed. When the bed begins to clog from particles, the flow is reversed, so the fluids stream (with organic etc.) flows up through the bed and a transfer out occurs, of the heel (including particles) from the top of the first bed and eventually to a separator. One system includes two beds connected in series, with particles accumulated at the top of the first bed, being transferred to the second bed when flow is reversed. A second reversal flows the particles to the separator apparatus. The separation apparatus can include a media bed of packing material, with the stream that emanates from the anthracite beds passing up through the media bed (where organic are removed from a fluid comprising primarily water). The large drops of organic continue upwardly to the top of a tank where they are removed, and the aqueous solution and particles flow in a 180° loop and downward to the bottom of the tank, where they may flow to a final coalescer such as an anthracite-garnet bed.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for separating hydrocarbons from a fluid stream that includes an aqueous solution, solid particles and microscopic droplets of organic, comprising:

first passing said fluid stream that includes organic along a primarily vertical first path through a first media bed that is effective in coalescing said droplets into larger drops but that also traps said particles at a first end of said first bed and passing said stream from a second end of said first bed later to a separator that further coalesces said drops of organic;

reversing the direction of flow of said fluid stream through said first bed by passing said fluid stream that includes organic in a second path that is opposite to said first path through said first bed and later to said separator, said reversal causing said particles to transfer out from said first end of said first bed to flow to said separator;

again reversing the direction of flow of said fluid stream that includes organic through said first bed.

2. The method described in claim 1, wherein:

first step of passing said fluid stream includes passing it along said first path (60) through said first media bed (56) from said second end of said first bed to a first end of a second media bed (58) while particles (74) accumulate at said first end of said first bed, and flowing said stream primarily vertically along a third path (64) through said second bed to a first end of said second bed and from there to said separator;

said step of reversing the direction of flow and passing said fluid stream in a second path (62) through said first bed, includes passing said fluid stream in a fourth path (66) that is opposite to said third path through said second bed, and from there to said separator to transfer said particles to said first end of said second bed;

said step of again reversing includes reversing the direction of flow through both of said beds, to transfer said particles from said first end of said second bed to said separator.

3. The method described in claim 2 wherein:

said step of first passing includes passing the fluid stream down through the first bed and up through the second bed;

said step of reversing the direction of flow includes passing the fluid stream up through the first bed and down through the second bed while transferring particles from the top of the first bed to the top of the second bed;

said step of again reversing includes flowing said particles out from the top of said second bed to said separator.

4. The method described in claim 1 including:

in said separator, passing said stream up through a tube of at least one meter height containing packing material that has passages of a plurality of millimeters width, flowing the aqueous solution of the stream and particles out of the top of said tube end in a 180° loop to flow down to the bottom of a tank that surrounds the tube and out from the bottom of the tank, while drops of organic rise to the top of the tank and are flowed out therefrom.

* * * * *